United States Patent [19]

Ida

[11] Patent Number: 4,739,423
[45] Date of Patent: Apr. 19, 1988

[54] CASSETTE TAPE RECORDING AND/OR REPRODUCING APPARATUS INCLUDING AN IMPROVED HEAD BASE ASSEMBLY

[75] Inventor: Mitsuru Ida, Saitama, Japan

[73] Assignee: Sony Corporation, Tokyo, Japan

[21] Appl. No.: 636,336

[22] Filed: Jul. 31, 1986

[30] Foreign Application Priority Data

Jul. 27, 1983 [JP] Japan .................... 58-136980

[51] Int. Cl.⁴ .................... G11B 5/54; G11B 15/00
[52] U.S. Cl. .................... 360/93; 360/90; 360/105
[58] Field of Search ............. 360/90, 93, 96.4, 96.5, 360/104, 105, 128, 137

[56] References Cited

U.S. PATENT DOCUMENTS

| | | | |
|---|---|---|---|
| 2,793,039 | 5/1957 | Hironimus | 360/90 |
| 3,609,844 | 10/1971 | Ichikawa | 360/105 |
| 3,800,324 | 3/1974 | Nakamichi | 360/105 |
| 3,918,093 | 11/1975 | Seale-Finch | 360/105 |
| 4,005,492 | 1/1977 | Kaufholz, Jr. | 360/105 |
| 4,038,694 | 7/1977 | Leshik | 360/105 |
| 4,071,861 | 1/1978 | Hirose | 360/105 |
| 4,176,383 | 11/1979 | Suzuki | 360/105 |
| 4,238,808 | 12/1980 | Tomita | 360/105 |
| 4,344,096 | 8/1982 | Tanaka et al. | 360/105 |
| 4,453,189 | 6/1984 | Ida | 360/104 |
| 4,511,941 | 4/1985 | Ida | 360/105 |
| 4,571,647 | 2/1986 | Tanaka et al. | 360/105 |
| 4,587,583 | 5/1986 | Tomita | 360/96.3 |

FOREIGN PATENT DOCUMENTS

| | | | |
|---|---|---|---|
| 0087290 | 8/1983 | European Pat. Off. | 360/93 |
| 0133025 | 2/1985 | European Pat. Off. | 360/105 |
| 59-63047 | 4/1984 | Japan | 360/90 |
| 59-146471 | 8/1984 | Japan | 360/96.5 |

Primary Examiner—John H. Wolff
Assistant Examiner—Alfonso Garcia
Attorney, Agent, or Firm—Lewis H. Eslinger

[57] ABSTRACT

A cassette tape recording and/or reproducing apparatus has a head base assembly comprised of a first arm mounted, at one end, on the chassis for swinging about a first axis perpendicular to a plane on which a cassette is located on the chassis, a second arm connected in end-to-end relation to the other end of the first arm by a joint structure permitting relative angular displacements about a second axis parallel to the first axis, and a fixed guide post extending parallel to the plane of the chassis and passing slidably through a slot in the second arm for stabilizing the position of a magnetic head on the second arm in respect to a cassette on the chassis. The joint structure includes a screw defining the second axis and being turnable to relatively displace the connected ends of the arms along that second axis for rocking the second arm about the fixed guide post and thereby varying the azimuth angle of the head.

15 Claims, 10 Drawing Sheets

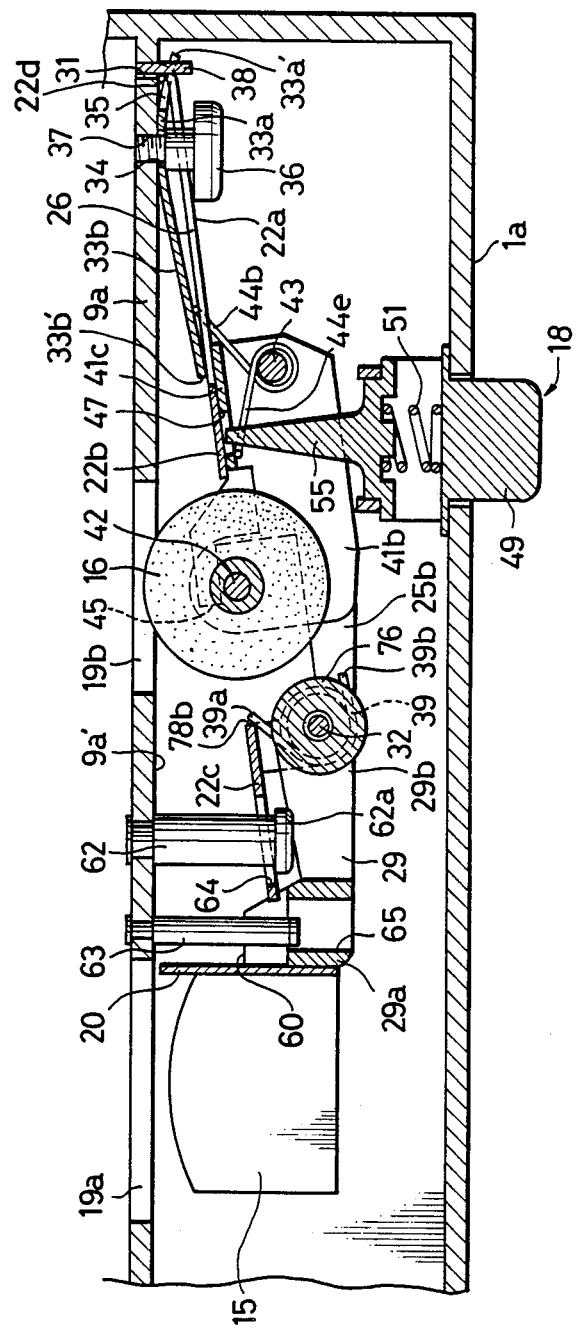

CASSETTE TAPE RECORDING AND/OR REPRODUCING APPARATUS INCLUDING AN IMPROVED HEAD BASE ASSEMBLY

BACKGROUND OF THE INVENTION

1. Field of the Invention

This invention relates generally to a cassette tape recording and/or reproducing apparatus, and more particularly is directed to the so-called head base assembly thereof, that is, the structure by which the magnetic head or heads and pinch roller are movably supported in such apparatus.

2. Description of the Prior Art

In cassette tape recording and/or reproducing apparatus, where size is not of critical importance, the head base plate which carries a recording and reproducing head and an erasing head is mounted on the chassis for rectilinear movements between operative and inoperative positions. However, when the size of the apparatus is of critical importance, for example, in the case of cassette tape recording and/or reproducing apparatus which is to be portable on the person of the user, the head base plate is usually pivotally mounted on the chassis for minimizing the space required therefor. For example, as shown in U.S. Pat. No. 4,010,493, one end of the head base plate may be pivotally mounted on a pivot post extending perpendicular from a chassis, and a recording and reproducing head and an erasing head are mounted on the head base plate at positions thereon remote from the pivot post so as to be movable between inoperative and operative positions in response to corresponding pivotal movements of the head base plate.

However, in such prior arrangements employing a pivoted head base plate, the end portion of the head base plate remote from the pivot post is susceptible to undesirable vibration or small movements in the direction normal to the plane of the chassis on which the cassette is located. If such vibrations or small movements occur in the recording or reproducing mode of the apparatus, the recording and reproducing head and the erasing head do not precisely engage the desired track or tracks on the magnetic tape.

In an attempt to avoid the above described undesirable vibrations or small movements of the pivoted head base plate in directions normal to the plane of the chassis, it has been proposed, for example, in U.S. Pat. No. 4,511,941, issued Apr. 16, 1985, and in U.S. Pat. No. 4,453,189, issued June 5, 1984, each having a common assignee herewith, to provide the chassis with stabilizing projections extending under the pivoted head base plate at a distance from the pivot post and being slidably engaged by the head base plate under the urging of a coil spring which extends around the pivot post and acts axially against the head base plate. However, the force of such spring acting on the head base plate at the pivoting axis thereof is insufficient to reliably prevent movements of the head base plate away from the stabilizing projections with the result that vibrations of the head base plate normal to the plane of the chassis can still occur at locations remote from the pivot post.

The above described arrangements pose another serious problem in that the head base plate is usually of one-piece construction and has both a pinch roller and at least one magnetic head mounted thereon at relatively smaller and larger distances, respectively, from the pivot post. In such case, the angular movements of the head base plate between its operative and inoperative positions must be large enough so that, in the inoperative position, the pinch roller will be withdrawn from a tape cassette located on the chassis to permit the loading or ejecting of the tape cassette. Since the magnetic head is at a further distance from the pivot post than the pinch roller on the one-piece head base plate, the angular movement of the head base plate to its inoperative position will result in an undesirably large movement of the magnetic head away from the tape cassette with the result that such arrangement is wasteful of the space required therefor.

OBJECTS AND SUMMARY OF THE INVENTION

Accordingly, it is an object of the present invention to provide a cassette tape recording and/or reproducing apparatus with an improved head base assembly which avoids the previously described disadvantages of the prior art.

More specifically, it is an object of this invention to provide a cassette tape recording and/or reproducing apparatus in which a head base assembly is provided for movements of a magnetic head thereon between inoperative and operative positions while preventing vibrations of the head in the direction perpendicular to the plane of the chassis on which a cassette is located.

A further object of the invention is to provide a cassette tape recording and/or reproducing apparatus, as aforesaid, in which the head base assembly for moving the magnetic head between its inoperative and operative positions minimizes the space required therefor.

Still another object of the invention is to provide a cassette tape recording and/or reproducing apparatus, as aforesaid, with a head base assembly which facilitates precise adjustment of the azimuth of the magnetic head.

In accordance with an aspect of this invention, in a cassette tape recording and/or reproducing apparatus having a chassis defining a substantially flat plane on which a tape cassette is adapted to be located, and a magnetic head movable into a cassette located on the chassis for engaging a driven tape therein and recording or reproducing signals on such tape; a head base assembly is provided with comprises a first arm member mounted, at one end, on the chassis for swinging about a first axis perpendicular to the plane on which the cassette is located, a second arm member having the magnetic head fixed thereto and being connected in end-to-end relation to the other end of the first arm member by joint means permitting relative angular displacements of the arm members about a second axis parallel to the first axis, and a fixed guide post extending parallel to the plane of the chassis and passing slidably through a slot in one of the arm members, and preferably in the second arm member, for stabilizing the distance from the magnetic head to the plane on which the cassette is located as the magnetic head moves into and out of a cassette located on the chassis.

In a preferred embodiment of this invention, the joint means connecting the first and second arm members includes a screw member defining the second axis and being turnable to relatively displace the connected ends of the arm members in the direction along the second axis for rocking the second arm member about the guide post member and thereby adjusting the azimuth of the magnetic head fixed to the second arm member.

The above, and other objects, features and advantages of this invention, will be apparent in the following detailed description of an illustrative embodiment thereof which is to be read in connection with the accompanying drawings wherein like reference numerals identify the corresponding parts in the several views.

BRIEF DESCRIPTION OF THE DRAWINGS

FIG. 6 is a sectional view taken along the line VI—VI on FIG. 5;

DETAILED DESCRIPTION OF A PREFERRED EMBODIMENT

Figure 1:
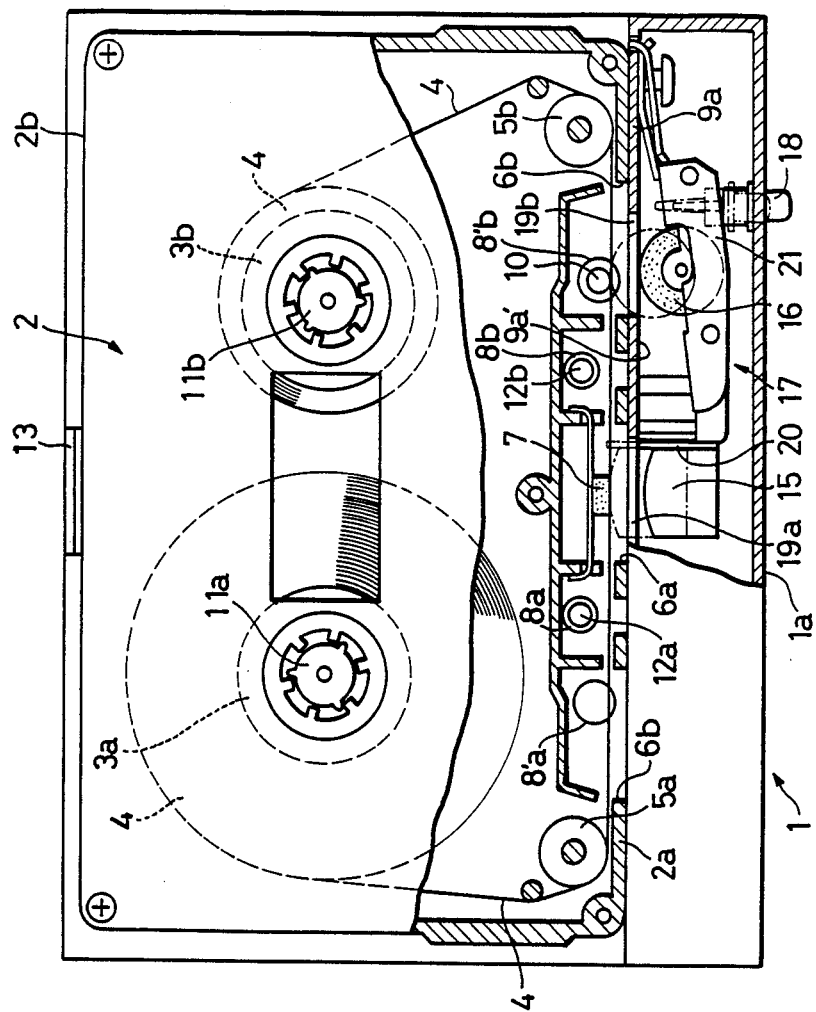
FIG. 1 is a plan view, partly broken away and in section, of a cassette tape recording and/or reproducing apparatus provided with a head base assembly according to an embodiment of this invention.

Referring to the drawings in detail, and initially to FIG. 1 thereof, it will be seen that a portable cassette tape reproducing apparatus 1 embodying the present invention is intended to accommodate a standard tape cassette 2 containing a pair of rotatable reel hubs 3a and 3b. A magnetic tape 4 has its ends fixed to hubs 3a and 3b and is wound on the latter, with the portion of tape 4 extending between the reel hubs 3a and 3b being guided by rollers 5a and 5b so as to run in a path extending along a front peripheral wall 2a of the cassette. The front peripheral wall 2a has a central opening or window 6a and a pair of windows 6b at opposite sides of the central window. A pressure pad 7 is mounted within cassette 2 so as to confront central window 6a. The standard tape cassette 2 is further shown to have pairs of holes 8a and 8b in the top and bottom walls of the cassette adjacent front peripheral wall 2a at locations intermediate the central window 6a and windows 6b. Finally, the top and bottom walls of tape cassette 2 are shown to have pairs of holes 8'a and 8'b spaced outwardly from the holes 8a and 8b, respectively, so as to be positioned adjacent the windows 6b.

The portable cassette tape reproducing apparatus 1 is generally shown to comprise a chassis 9 defining a flat plane on which tape cassette 2 is adapted to be located with the front peripheral wall 2a of the cassette abutting against an upstanding wall 9a at the forward portion of the chassis. A rotary capstan 10 extends upwardly from chassis 9 into one or the other of the pairs of openings 8'a and 8'b of the cassette 2 located on the chassis. A pair of spaced apart spindles or drive shafts 11a or 11b extend upwardly from chassis 9 and are adapted to engage and be rotatably coupled with reel hubs 3a and 3b of the located cassette. Positioning pins 12a and 12b extend upwardly from chassis 9 and are adapted to be received in openings 8a and 8b for accurately positioning the cassette on the chassis. A spring 13 is provided on chassis 9 to engage the back peripheral wall 2b of cassette 2 at the center of the latter for yieldably urging the cassette forwardly and thereby ensuring firm contact of front peripheral wall 2a of the cassette with upstanding wall 9a of the chassis.

The apparatus 1 is further shown to have a magnetic head 15 and a pinch roller 16 carried by a head base assembly 17 embodying this invention and which is disposed in front of upstanding wall 9a, that is, at the side 9'a of wall 9a which is opposite the side engaged by cassette 2. A push-button device 18 extends from a front wall 1a of apparatus 1 and is manually actuable for effecting movements of head base assembly 17 from an inoperative position shown in dot-dash lines. Upstanding wall 9a of chassis 9 is shown to have apertures 19a and 19b which register with windows 6a and 6b of the cassette 2 located on the chassis so that, when push-button device 18 is actuated, magnetic head 15 and pinch roller 16 are moved through aperture 19a and window 6a and through aperture 19b and one of the windows 6b, respectively, and press the magnetic tape 4 against pressure pad 7 and rotary capstan 10, respectively, as shown in dot-dash lines on FIG. 1. At the same time, a tape guide 20 fixedly mounted beside magnetic head 15 is moved with the latter through aperture 19a and window 6a for engaging, and thereby guiding the opposite longitudinal edges magnetic tape 4.

When push-button device 18 is actuated and a power switch (not shown) is turned "ON", capstan 10 and spindles 11a and 11b are suitably driven by a motor (not shown) so that magnetic tape 4 is propelled at a constant speed between magnetic head 15 and pressure pad 7, thereby to establish the reproducing or playback mode of apparatus 1.

The head base assembly 17 according to an embodiment of this invention will now be described in detail with reference to FIGS. 2–6. As shown particularly on FIG. 2, the assembly 17 generally comprises a first arm member 22 mounted, at one end, on chassis 9 for swinging relative to the latter about a first axis perpendicular to the plane on which a cassette 2 is located, a second arm member 23 having the head 15 mounted thereon, and a joint structure 24 connecting the second arm member 23 in end-to-end relation to the other end of the first arm member 22 and permitting relative angular displacements of arm members 22 and 23 about a second axis parallel to the first axis.

Figure 2:
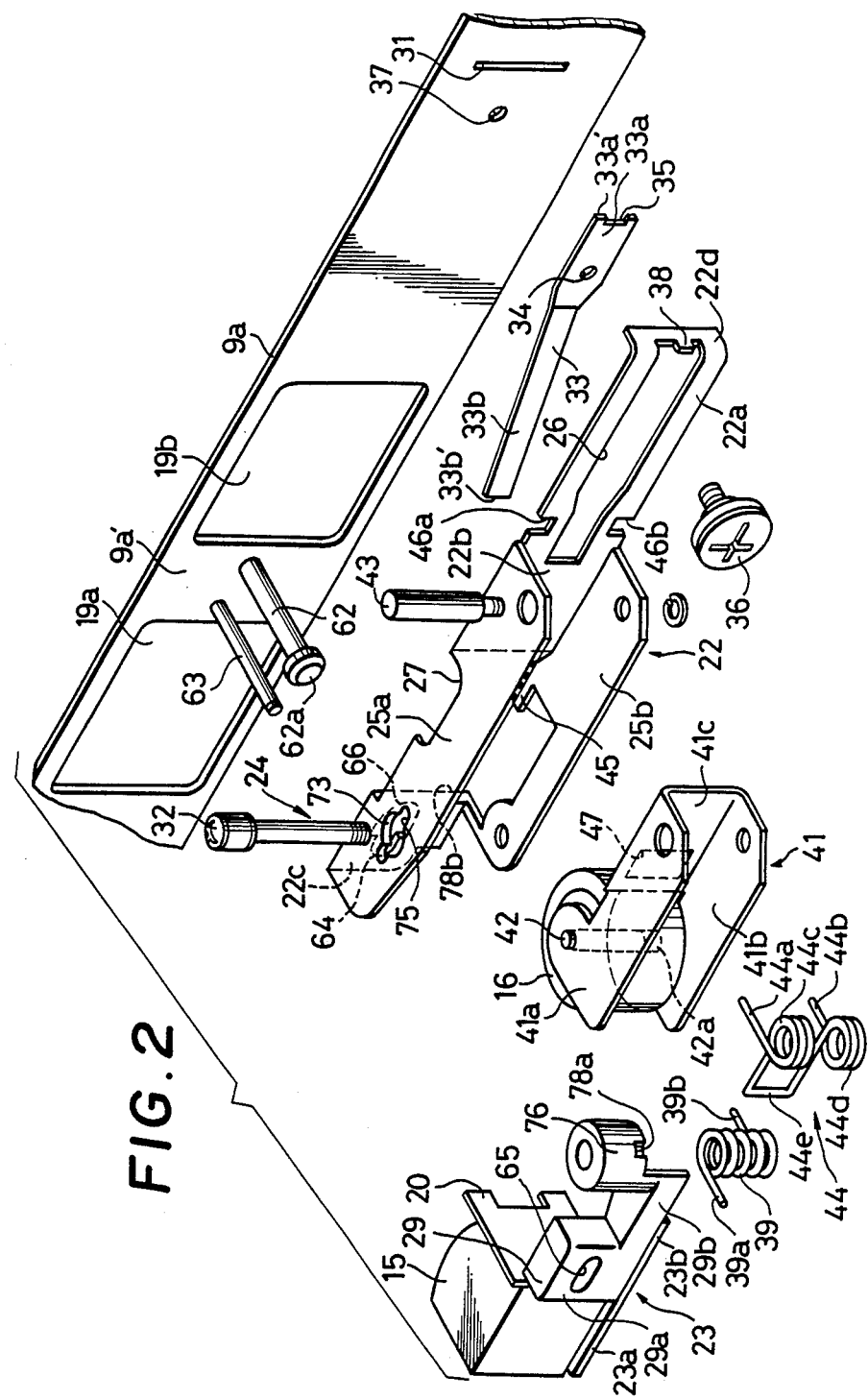
FIG. 2 is an exploded, perspective view, on an enlarged scale, of the head base assembly of FIG. 1.
Figure 3:
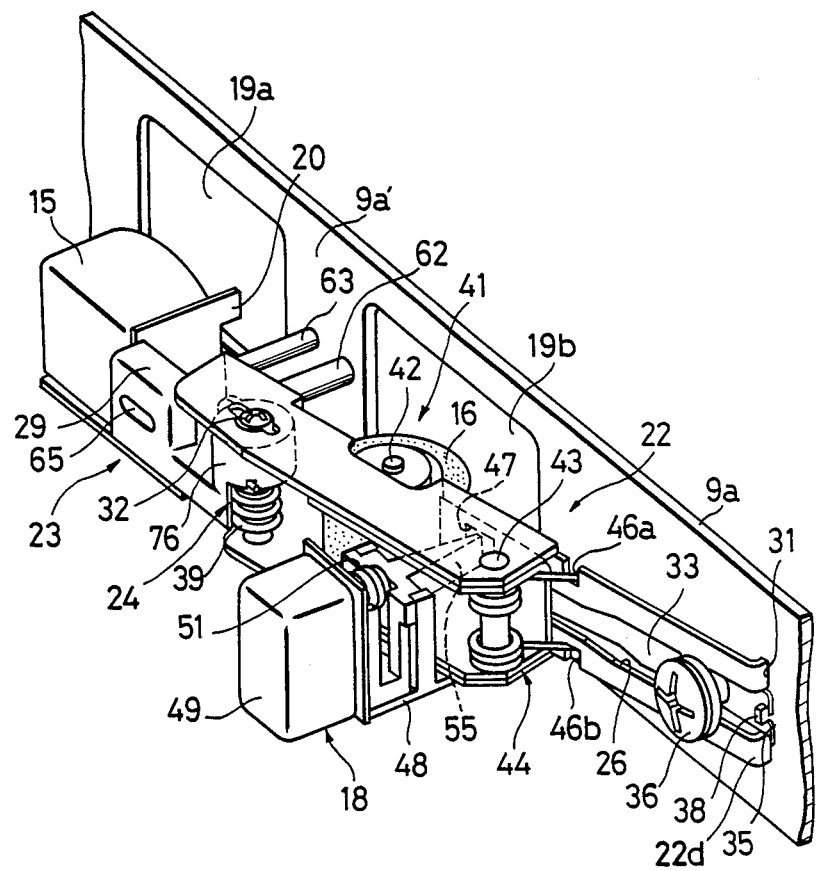
FIG. 3 is a perspective view of the parts of the head base assembly appearing on FIG. 2, but shown in assembled condition.

As shown particularly on FIG. 2, first arm member 22 is desirably formed of sheet metal and, at one end portion 22a, has a rearwardly bent end 22d. Parallel, forwardly directed upper and lower flanges 25a and 25b extend along arm member 22 from a central portion 22b thereof to the end 22c remote from bent end 22d. An elongated slot 26 extends along arm member 22 from central portion 22b to bent end 22d. Further, a window or cutout 27 is formed in arm member 22 between flanges 25a and 25b along the length of arm member 22 between central portion 22b and end portion 22c.

Figure 5:
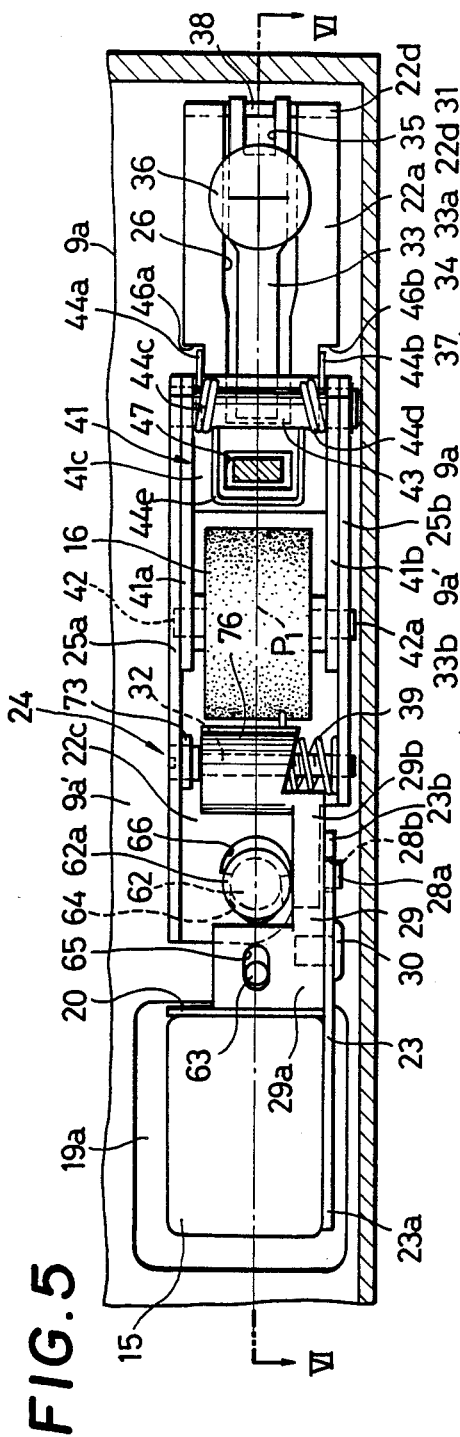
FIG. 5 is a sectional view taken along the line V—V on FIG. 4.
Figure 14:
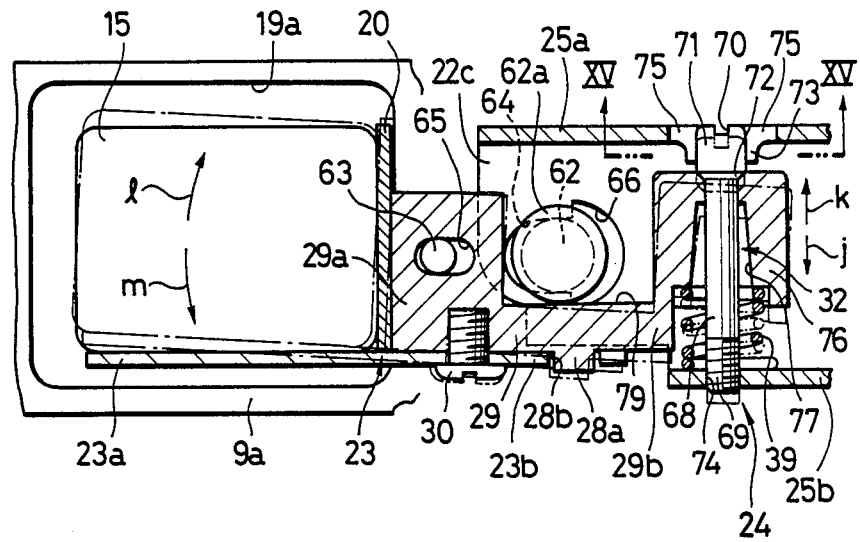
FIG. 14 is a sectional view taken along the line XIV—XIV on FIG. 12.

As shown particularly on FIGS. 2, 5 and 14, second arm member 23 may desirably include an elongated metal plate 23a on which head 15 is suitably secured, as by welding, and an attachment portion 29 molded or otherwise suitably formed of a synthetic resin and being secured, as by a screw 30, to a projecting end portion 23b of metal plate 23. Further, attachment portion 29 is formed with a depending projection 28a which is receivable in a hole 28b formed in end portion 23b of plate 23a so as to cooperate with screw 30 in securely positioning plate 23a and attachment portion 29 relative to each other.

As shown on FIGS. 3-6, the bent end 22d of arm member 22 is inserted into a slit 31 extending through wall 9a at right angles to the plane of chassis 9 on which cassette 2 is to be located. Thus, arm member 22 is mounted in respect to wall 9a of the chassis for swinging movements relative to the latter in the directions of the arrows a and b on FIG. 4 about a first axis defined by slit 31.

Figure 4:
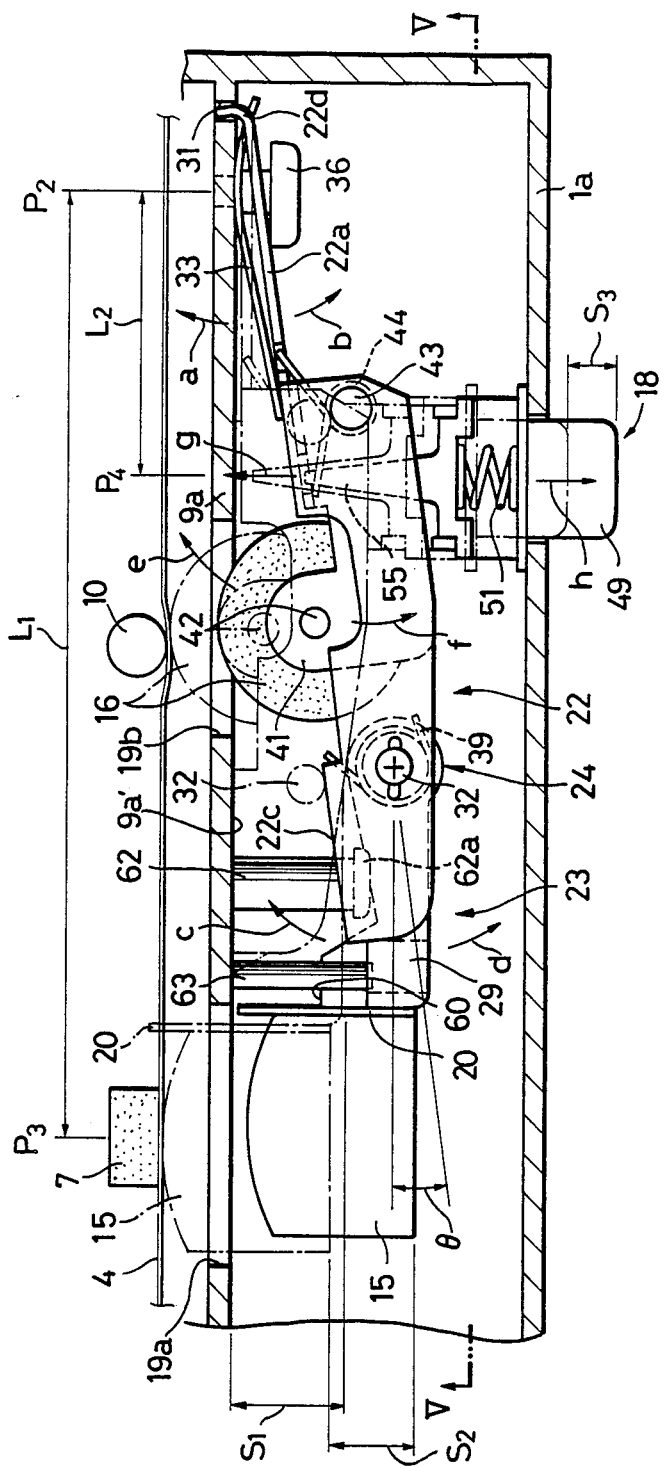
FIG. 4 is a plan view of the head base assembly of FIG. 3, and which is shown in full lines in its inoperative position and in dot-dash lines in its operative position.

The joint structure 24 is shown to include a screw member 32 secured to arm member 22 adjacent the end 22c of the latter remote from bent end 22d and extending parallel to the axis defined by slit 31 for defining the second axis about which arm member 23 is swingable relative to arm member 22 in the directions of the arrow c and d on FIG. 4.

Figure 7:
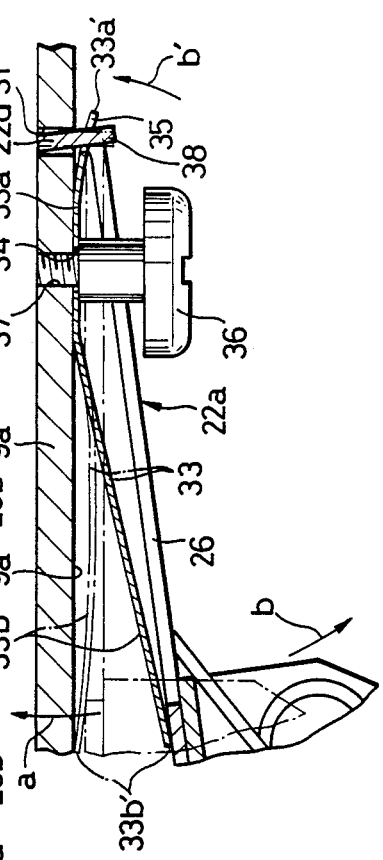
FIG. 7 is an enlarged detail view which illustrates the pivotal mounting of an arm member of the head base assembly embodying the invention on a portion of the chassis of the recording and/or reproducing apparatus.

The first arm member 22 is urged in the direction of the arrow b to its inoperative position shown in full lines on FIG. 4 by a bowed leaf spring 33 which is positioned between arm member 22 and upstanding wall 9a. Bowed or bent spring 33 has a hole 34 extending therethrough relatively close to one end so as to divide the length of spring 33 into a short portion 33a which is formed with a central notch 35 at its forked end 33a' and a relatively long portion 33b. A screwed 36 extends through hole 34 in leaf spring 33 and is screwed into a tapped hole 37 in upstanding wall 9a for securing spring 33 to wall 9a of the chassis with major or long portion 33b of the spring being inclined forwardly from side or surface 9a' of wall 9a and terminating in an end 33b' which acts against the central portion 22b of arm member 22. As shown particularly on FIG. 2, a claw 38 is formed at the end of slot 26 terminating in bent end 22d of arm member 22, and short portion 33a of spring 33 is dimensioned so that claw 38 is received in notch 35. Thus, the forked end 33a' of spring 33 acts against bent end 22d for urging the latter in the direction of the arrow b' on FIG. 7. In other words, spring 33 acts to ensure engagement of the bent end 22d of arm member 22 in slit 31 of upstanding wall 9a. It will be appreciated that, when arm member 22 is moved in the direction of the arrow a to its operative position shown in dot-dash lines on FIG. 7, the major portion of the length of spring 33 is received in slot 26.

The second arm member 23 is urged to turn relative to first arm member 22 in the direction of the arrow c on FIG. 4 by means of a coil spring 39 extending around screw member 32 and engaging, at its opposite ends, against arm members 22 and 23, as hereinafter described in detail. The attachment portion 29 of arm member 23 is engageable against end 22c of arm member 22 for limiting the turning of arm member 23 relative to arm member 22 under the urging of spring 39 to the relative positions shown in solid lines on FIG. 4 and in which a predetermined angle $\theta$ is included between the longitudinal axes of the arm members.

A support arm 41 for pinch roller 16 is shown particularly on FIG. 2 to be formed of sheet metal and to have parallel flange portions 41a and 41b with a connecting portion 41c extending therebetween. Pinch roller 16 is shown to be rotatable on an axle 42 which, at its opposite ends, is mounted in end portions of flanges 41a and 41b extending beyond connecting portion 41c. Pinch roller support arm 41 is pivotally mounted, at its end remote from axle 42, on a pivot pin 43 (FIGS. 3-6) which is secured, at its ends, in flanges 25a and 25b of arm member 22 adjacent the central portion 22b of the latter. Pinch roller support arm 41 is angularly urged relative to arm member 22 in the direction of the arrow e on FIG. 4, that is, in the direction urging pinch roller 16 to extend through cutout 27 of arm member 22, by means of a coled spring member 44 which is mounted on pivot pin 43 between flanges 41a and 41b. The angular displacement of pinch roller support arm 41 relative to arm member 22 under the urging of spring member 44, that is, in the direction of the arrow e on FIG. 4, is limited by the engagement of a downwardly projecting lower end portion 42a of axle 42 with a stop 45 (FIGS. 2, 5 and 6) extending from flange 25b into cutout 27 of arm member 22. Coiled spring member 44 is particularly shown on FIG. 2 to have a pair of parallel end portions 44a and 44b extending from a pair of coil portions 44c and 44d, respectively, and a U-shaped central portion 44e extending between coil portions 44c and 44d and initially formed to lie in a plane approximately at right angles to the plane of end portions 44a and 44b. In the assembled condition of head base assembly 17, coil portions 44c and 44d extend around pivot pin 43 (FIGS. 3-6) with end portions 44a and 44b engaging in notches 46a and 46b formed in the top and bottom edges of arm member 22, and with central portion 44e engaging resiliently against the connecting portion 41c of pinch roller support arm 41 so as to urge the latter in the direction of the arrow e on FIG. 4. Further, spring member 44 is dimensioned so that, when installed as described above, coil portions 44c and 44d are resiliently urged in the opposite axial directions against flange portions 41a and 41b of support arm 41 with the result that the central portion 44e of the spring member is precisely centered with respect to the central plane $P_1$ of pinch roller 16, as shown on FIG. 5. If the material of spring member 44 has a small "resilient constant", sufficient pressure will be obtained from the two coil portions 44c and 44d. As shown particularly on FIGS. 2 and 5, connecting portion 41c of the pinch roller support arm 41 has a hole 47 therein, and U-shaped central portion 44e of spring member 44 is dimensioned to extend around such hole 47.

Figure 8:
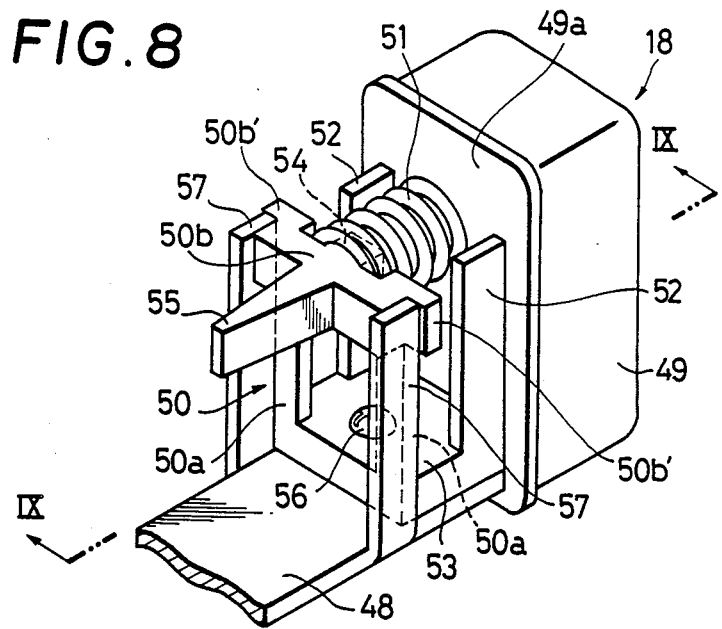
FIG. 8 is an enlarged perspective view of a push-button device which is desirably employed for actuating the head base assembly embodying the invention.
Figure 9:
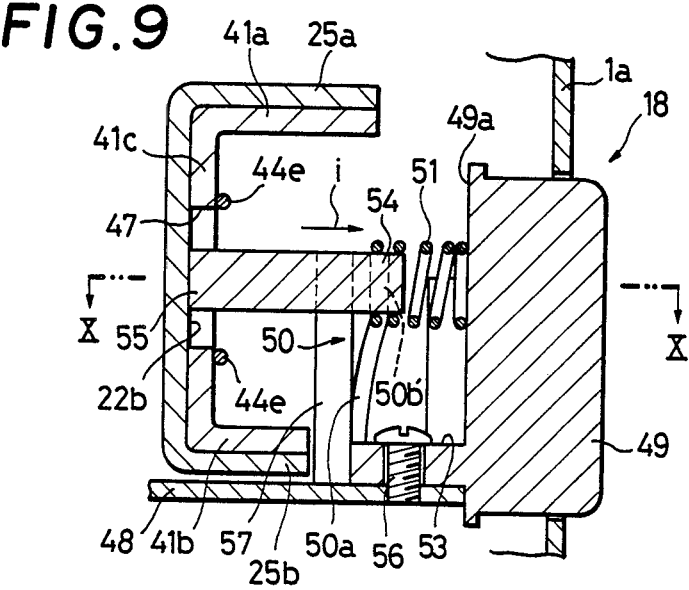
FIG. 9 is a sectional view taken along the line IX—IX on FIG. 8.
Figure 10:
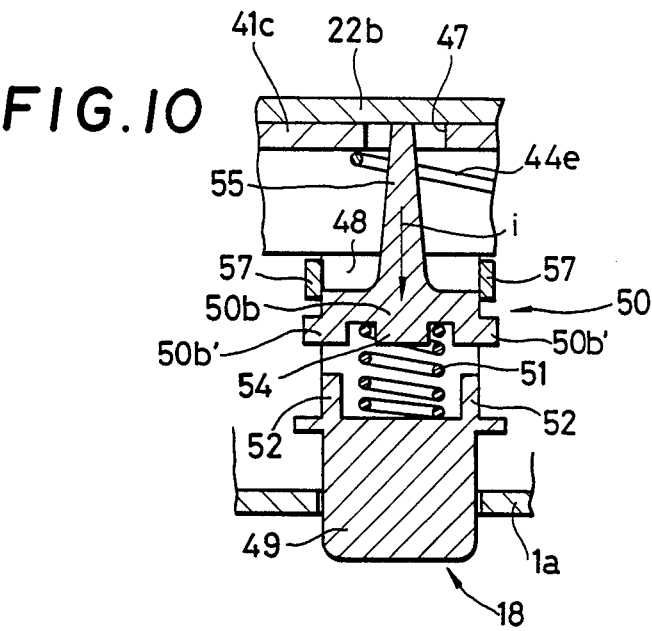
FIG. 10 is a sectional view taken along the line X—X on FIG. 9.

Referring now to FIGS. 8-10, it will be seen that push-button device 18 includes a slide 48 mounted below chassis 9 for slidable movements relative thereto in the directions of the arrows g and h on FIG. 4. A body portion 49 of push-button device 18 projects forwardly through a corresponding opening in front wall 1a of the apparatus and is desirably molded of a synthetic resin so as to have a rim 49a which prevents forward removal of body portion 49 through the respective opening in front wall 1a. At the back of body portion 49, and molded integrally therewith, there is an actuator portion 50, with a coil spring 51 being interposed between body portion 49 and actuator portion 50. Laterally spaced apart stiffening ribs 52 are formed integrally on the back surface of body portion 49 along with a bottom portion 53 extending rearwardly from body portion 49 between the lower ends of ribs 52. The actuator portion 50 includes a pair of upstanding resilient posts 50a extending from the opposite sides of bottom portion 53 at the end of the latter remote from body portion 49 and being connected, at their upper ends, by an integral lateral beam 50b. A spring locating projection 54 extends from the center of beam 50b in the direction toward body portion 49 and is inserted in coil spring 51 for locating the latter. A wedge-shaped projection 55 extends from the center of beam 50b in the direction away from body portion 49. A screw 56 extends through a hole in bottom portion 53 and secures the latter to slide 48. Slide 48 and push-button device 18 connected therewith are located in respect to head base assembly 17 so that the wedge-shaped projection 55 extends through hole 47 in pinch roller support arm 41 and engages, at its free end, against the central portion 22b of arm member 22. Formed integrally with slide 48, at the opposite sides thereof, are upstanding abutments 57 which are relatively rigid, and which are engageable, at their upper end portions, by the ends 50b' of beam 50b.

Figure 11:
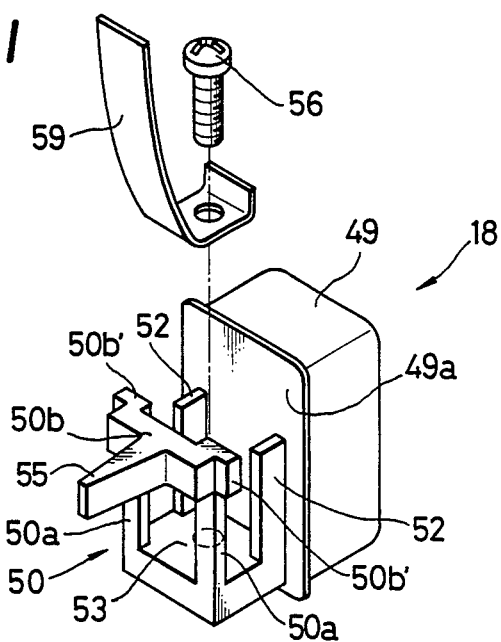
FIG. 11 is a perspective view similar to that of FIG. 8, but showing a modification of the push-button device.
Figure 12:
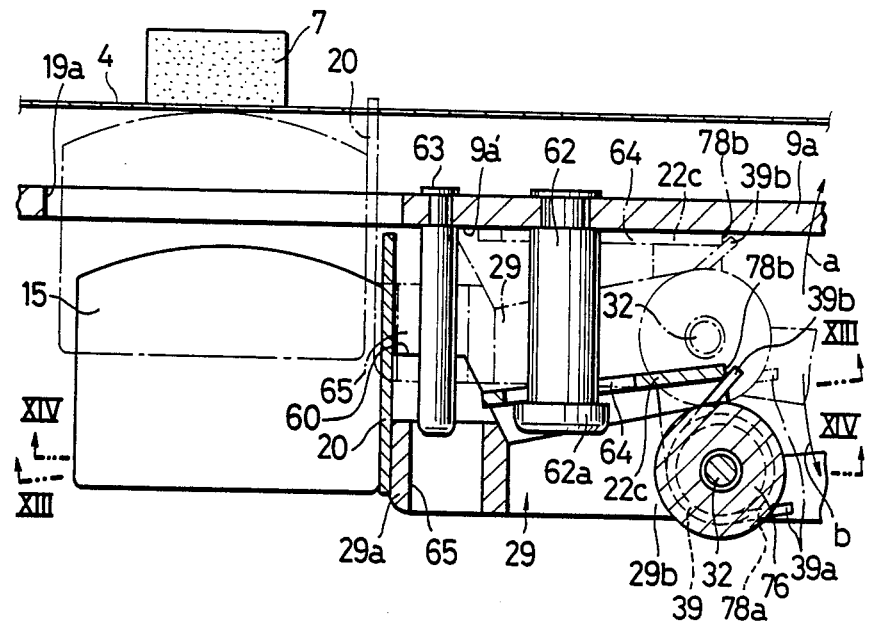
FIG. 12 is an enlarged fragmentary sectional view illustrating a portion of the structure appearing in FIG. 6 in the inoperative and operative positions of the head base assembly for showing the relationship between the arm members and guide post members included in the head base assembly embodying the invention.
Figure 13:
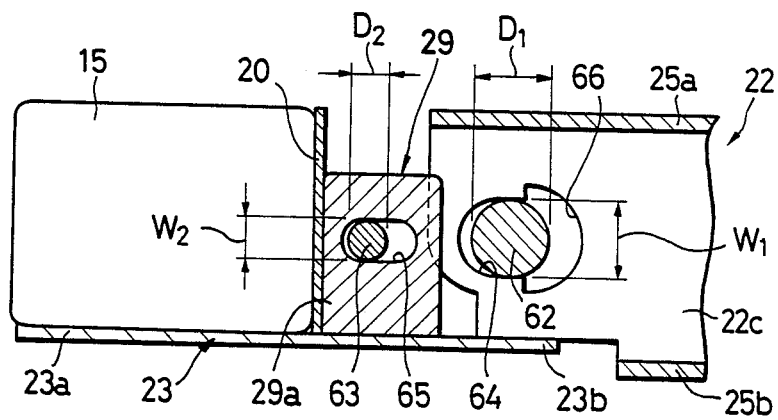
FIG. 13 is a sectional view taken along the line XIII—XIII on FIG. 12.

It will be appreciated that, by reason of the resilient character of posts 50a, a force manually applied to body portion 49 for depressing the latter is largely applied through coil spring 51 to wedge-like projection 55 for angularly displacing arm member 22 to its operative position against the force of spring 33. Of course, the coil spring 51 can be replaced by rubber or other resilient members, for example, by an elongated plate spring 59 fixed, at one end, by the screw 56 to bottom portion 53 while the other or free end of plate spring 59 acts against the surface of beam 50b, as shown on FIG. 11. Of course, a resilient element functionally equivalent to the plate spring 59 of FIG. 11 could be formed integrally with body portion 49 of push-button device 18.

In the stop mode of apparatus 1, slide 48 is moved by a spring (not shown) in the direction of the arrow h on FIG. 4 for disposing body portion 49 of push-button device 18 in its inoperative position shown in full lines. With push-button device 18 in such inoperative position, spring 33 urges arm member 22 angularly in the direction of the arrow b about the axis defined by bent end 22d engaging in slit 31, with the result that magnetic head 15 and pinch roller 16 are maintained in their inoperative positions shown in full lines.

When body portion 49 of push-button device 18 is manually depressed or moved in the direction of the arrow g through a distance $S_3$ to its operative position shown in dot-dash lines on FIG. 4, slide 48 is suitably locked in its corresponding operative position by a suitable latching plate or assembly (not shown).

During the manual depressing of body portion 49 toward its operative position, such movement of body portion 49 is at least initially fully transmitted to wedge-shaped portion 55, and hence to arm member 22 since coil spring 51 is substantially stronger than leaf spring 33, that is, coil spring 51 has a greater resistance to flexing than does leaf spring 33. Therefore, arm member 22 is angularly displaced in the direction of the arrow a on FIG. 4 to its operative position shown in dot-dash lines in response to movement of body portion 49 toward its operative position. In response to such angular displacement of arm member 22, arm member 23 is similarly moved to its operative position shown in dot-dash lines on FIG. 4 with the result that magnetic head 15 and pinch roller 16 are moved to their respective operative positions bearing against pressure pad 7 and capstan 10 with the tape 4 therebetween.

The several parts of head base assembly 17 are dimensioned so that prior to the arrival of arm member 22 at it operative position shown in broken lines on FIG. 4, pinch roller 16 comes against capstan 10 with the result that, during the final angular displacement of arm member 22 to its operative position, pinch roller support arm 41 turns slightly relative to arm member 22 in the direction of the arrow f about pivot 43. Such turning of support arm 41 in the direction of arrow f relative to arm member 22 is effected against the force of coiled spring member 44. Thus, the pressure of pinch roller 16 against capstan 10 in the operative position of the pinch roller is established by coil spring member 44 with such pressure being uniformly applied by reason of the precise positioning of the central portion 44e of coiled spring member 44 relative to the central plane of the pinch roller 16, as previously described.

It is further to be noted that before body portion 49 of push-button device 18 is fully depressed through the distance or stroke $S_3$ to its operative position, end 22c of arm member 22 engages against wall 9a of chassis 9 and thereby prevents further turning of arm member 22 beyond the position shown in dot-dash lines on FIG. 4. Therefore, after arm member 22 attains its operative position, and during the final movement of body portion 49 to its operative position, resilient posts 50a of actuator portion 50 are made to flex and coil spring 51 is compressed in the direction of the arrow i on FIGS. 9 and 10. In other words, after arm member 22 has attained its operative position against wall 9a of the chassis, posts 50a and coil spring 51 can flex to permit the final additional movement of body portion 49 and slide 48 to their operative positions at which slide 48 is thereafter locked. Thereafter, and so long as push-button device 18 is locked in its operative position, arm member 22 continues to be pressed against surface 9a' of wall 9a by the resilient forces of posts 50a of actuator portion 50 and coil spring 51, respectively.

Prior to the contact of the end portion 22c of arm member 22 against surface 9a' of upstanding wall 9a during the turning of arm member 22 in the direction of the arrow a on FIG. 4, a stop surface 60 formed on attachment portion 29 of arm member 23 engages against surface 9a'. Thus, during the final increment of turning movement of arm member 22 to its operative position, arm member 23 is turned relative to arm member 22 about the axis defined by screw member 32 in the direction of the arrow d against the force of coil spring 39. By reason of such final turning of arm member 23 relative to arm member 22, the orientation of magnetic head 15 is maintained parallel to run of magnetic tape 4 exposed at window 6a for ensuring that the gap in the magnetic core of head 15 precisely scans the tape. Because arm member 23 is pressed against the front surface 9a' of wall 9a by the force of coil spring 39, the magnetic head 15 is precisely and reliably located in its operative position. Further, by suitably locating the stop surface 60 on attachment portion 29 of arm member 23, the frictional resistance to the movement of magnetic tape 4 between pressure pad 7 and the operatively positioned head 15 can be easily maintained constant at a desirable value so that the magnetic tape path is stabilized during recording and/or reproducing operations.

It is also to be appreciated that, by reason of the provision of relatively swingable arm members 22 and 23 and joint structure 24 therebetween, the distance $L_1$ between the location $P_2$ where head base assembly 17 is pivoted on the chassis, and the location $P_3$ where head 15 is engageable against tape 4 backed up by pressure pad 7 can be made relatively small while head 15 is maintained in an orientation parallel to the run of tape 4 extending between guide rollers 5a and 5b in the operatively positioned cassette 2. Furthermore, the stroke $S_2$ (FIG. 4) of magnetic head 15 between its inoperative and operative positions can be made smaller than, or at least no greater than the stroke $S_1$ of first arm member 22 at its end 22c. By reason of the foregoing, the space required for the movements of the head base assembly 17 can be relatively small with the result that the overall size of the apparatus 1 can be reduced in accordance with this invention.

It is also to be noted that, because the wedge-shaped projection 55 of push-button device 18 acts directly against arm member 22 at a location $P_4$ (FIG. 4) near to pinch roller 16 and at a distance $L_2$ from location $P_2$ which is desirably approximately one-third the distance $L_1$, the stroke $S_3$ for the body portion 49 of push-button device 18 can be substantially shorter than the stroke $S_2$ of the magnetic head. Thus, the projection of push-button device 18 from the front wall 1a of the housing of apparatus 1 can be desirably minimized.

Of course, when a stop button (not shown) of apparatus 1 is actuated with the apparatus in its play mode, the previously mentioned latching plate or assembly is released from slide 48, with the result that push-button device 18 and head base assembly 17 are returned to their inoperative positions for similarly locating magnetic head 15 and pinch roller 16, as shown in full lines on FIG. 4.

As shown particularly on FIGS. 12-15, the head base assembly 17 according to an embodiment of this invention further includes a pair of parallel guide posts 62 and 63 extending fixedly from the front surface 9a' of wall 9a parallel to the plane of chassis 9 on which a cassette is located. Guide posts 62 and 63 are slidably received in slots 64 and 65, respectively, formed in end portion 22c of arm member 22 and in an end portion 29a of attachment portion 29 of arm member 23, respectively. Slot 64 has a width $W_1$ which is approximately equal to the diameter $D_1$ of post 62, and slot 65 has a width $W_2$ approximately equal to the diameter $D_2$ of post 63. Therefore, fixed posts 62 and 63 stabilize the distances from the engaged portions of arm members 22 and 23 to the plane of chassis 9 on which a cassette is located during the angular displacements of arm members 22 and 23 for moving head 15 to and from its operative position. The post 62 is shown to have a head 62a at the end thereof remote from wall 9a and which is engageable by end portion 22c of arm member 22 for defining the inoperative position of the latter to which it is urged by spring 33. Slot 64 is shown, particularly on FIG. 13, to have an enlarged diameter end portion 66 through which head 62a of post 62 can be inserted when arm member 22 is being mounted for pivotal movements relative to wall 9a.

Figure 15:
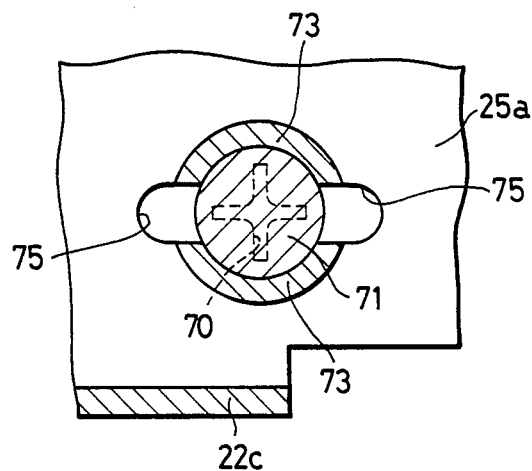
FIG. 15 is an enlarged fragmentary sectional view taken along the line XV—XV on FIG. 14.

Screw member 32 of joint structure 24 is shown to have a smooth portion or shaft 68 terminating in a threaded lower end portion 69, and an enlarged head 71 at its other end formed with a slot 70 for receiving a screw driver and defining a shoulder 72 between head 71 and shaft 68 (FIG. 14). Upper flange 25a of arm member 22 has arcuate rims 73 depending therefrom at opposite sides of a slot 75 and being dimensioned to slidably embrace head 71 of screw member 32 (FIG. 15). The threaded lower end portion 69 of screw member 32 is threadably engaged in a tapped hole 74 in lower flange 25b of arm member 22. Thus, rotation of screw member 32, as by a screw driver engaged with slot 70 in head 71, is effective to move shoulder 72 of the screw member in the axial direction of the latter relative to lower flange 25b of arm member 22.

The end portion 29b of attachment portion 29 remote from end portion 29a is in the form of a cylindrical hub 76 defining a frusto-conical cavity 77 loosely receiving screw member 32 and providing, at its upper end, a seat for shoulder 72 of the screw member (FIG. 14). Coil spring 39 is disposed around screw member 32 between lower flange 25b of arm member 22 and hub 76 so that the upper surface or seat defined by hub 76 is urged by spring 39 against the shoulder 72 of screw member 32. Simultaneously, by reason of the engagement of the end portions 39a and 39b of coil spring 39 in a notch 78a formed in the lower edge of hub 76 (FIG. 2) and against an end edge 78b of end portion 22c of arm member 22 (FIG. 12), respectively, arm member 23 is urged to turn relative to arm member 22 around the axis of screw member 32 in the direction of the arrow c on FIG. 4. As shown particularly on FIG. 14, attachment portion 29 has a depression or cutout 79 between its end portions 29a and 29b for accommodating guide post 62 so that the latter will not interfere with either angular movements of arm member 23 relative to arm member 22 about the axis of screw member 32 or with rocking movements of arm member 23 about the axis of guide post 63.

It will be appreciated that, when screw member 32 is rotated, as by a screwdriver engaging its slot 70, so as to move the screw member axially in the direction of the arrow i on FIG. 14, shoulder 72 of the screw member moves hub 76 downwardly against the pressure of coil spring 39, with the result that attachment portion 29 is rocked around guide post 63 for displacing arm member 23 and the head 15 thereon in the direction of the arrow 1. On the other hand, in response to turning of screw member 32 in the direction to cause upward movement of the screw member in the direction of the arrow k, hub 76 is a correspondingly moved upward by the force of coil spring 39, with the result that attachment portion 29, and hence arm member 23, is rocked about guide post 63 in the direction of the arrow m on FIG. 14. Therefore, rotation of screw member 32 in one direction or the other is effective to vary the azimuth angle of magnetic head 15 on arm member 23.

Thus, guide post 63 performs dual functions, that is, it functions to hold arm member 23 at a constant height relative to the chassis during the movements of head 15 between its operative and inoperative positions, and it also functions as the axis about which arm member 23 rocks when screw member 32 is turned in one direction or the other for adjusting the azimuth angle of head 15. The coil spring 39 also has dual functions, namely, to angularly urge arm member 23 in one direction relative to arm member 22 about the axis of screw member 32, and to urge hub 76 along screw member 32 in the direction for seating hub 76 against the head 71 of the screw member. From the foregoing, it will be appreciated that head base assembly 17 according to this invention has several of its parts constructed and arranged relative to each other to perform dual functions, thereby simplifying the structure of the assembly and minimizes the space required therefor.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a cassette tape recording and/or reproducing apparatus having a chassis defining a substantially flat plane on which a tape cassette is adapted to be located, and a magnetic head moveable into a cassette located on the chassis for engaging a tape therein and recording or reproducing signals on such tape; a head base assembly on which said magnetic head is mounted for movement into said cassette comprising first and second arm members each having spaced apart ends; means mounting said first arm member, at one end, on said chassis for swinging relative to the latter about a first axis perpendicular to said plane; joint means connecting one end of said second arm member to the other end of said first arm member for mounting said second arm member on said first arm member in substantially end-to-end relation and permitting relative angular displacements thereof about a second axis substantially parallel to said first axis, said second arm member having said head mounted thereon; and a guide post member fixed relative to said chassis and extending parallel to said plane of said chassis, one of said arm members having a slot therein slidably receiving said guide post member for stabilizing the perpendicular distance from said head to said plane as the head moves into and out of a cassette on said chassis.

2. A cassette tape recording and/or reproducing apparatus according to claim 1; in which said slot is in said second arm member.

3. A cassette tape recording and/or reproducing apparatus according to claim 2; in which the width of said slot measured in the direction perpendicular to the plane of said chassis is substantially the same as the diameter of said guide post member measured in said direction.

4. A cassette tape recording and/or reproducing apparatus according to claim 3; in which said slot is located between said head and said one end of said second arm member connected by said joint means; said joint means including means for rocking said second arm member about said guide post member to vary the azimuth angle of said head.

5. A cassette tape recording and/or reproducing apparatus according to claim 4; in which said joint means includes a screw member defining said second axis and being turnable to relatively displace said other end of said first arm member and said one end of said second arm member in the direction of said second axis and thereby cause said rocking of the second arm member about said guide post member.

6. A cassette tape recording and/or reproducing apparatus according to claim 5; in which said joint means further includes coil spring means extending around said screw member and acting against said other end of the first arm member and said one end of said second arm member for urging said second arm member to turn relative to said first arm member about said second axis in the direction for moving said head into a cassette located on said chassis, and for urging one of said other end of said first arm member and said one end of said second arm member relative to the other in one direction along said second axis.

7. A cassette tape recording and/or reproducing apparatus according to claim 6; in which said first arm member includes spaced flanges at said other end and between which said one end of said second arm member extends, one of said flanges has a tapped hole in which said screw member is threaded, said one end of said second arm member includes a hub portion extending loosely about said screw member and defining a seat for a head of said screw member, and said coil spring means is interposed between said hub portion and said one flange for urging said seat against said head of the screw member.

8. A cassette tape recording and/or reproducing apparatus according to claim 7; in which the other of said flanges has a guide hole in which said head of the screw member is slidable.

9. A cassette tape recording and/or reproducing apparatus according to claim 7; further comprising a second fixed guide post member extending parallel with the first-mentioned fixed guide post member, said first arm member having a slot in said other end and which receives said second fixed guide post member.

10. A cassette tape recording and/or reproducing apparatus according to claim 9; further comprising return spring means urging said first arm member to swing about said first axis in a direction away from a cassette on said chassis; a head on said second fixed guide post member engageable with said first arm member for limiting the swinging of the latter by said return swing means; and an enlargement at one end of said slot in the first arm member to permit the passage therethrough of said head on the second guide post member when assembling said head base assembly on said chassis.

11. A cassette tape recording and/or reproducing apparatus according to claim 4; in which said chassis has an upstanding wall extending perpendicularly from said plane and against one side of which the cassette is located, said first and second arm members are disposed at the other side of said wall, said wall has an opening through which said magnetic head is moveable into and out of the cassette, said means mounting the first arm member is secured to said wall, and said fixed guide post member extends from said wall.

12. A cassette tape recording and/or reproducing apparatus according to claim 11; in which said joint means includes first spring means urging said second arm member to turn relative to the first arm member about said second axis in the direction for moving said magnetic head into the cassette; and further comprising second spring means urging said first arm member to swing about said first axis in a direction away from said wall, push-button means engageable with said first arm member for angularly displacing the latter about said first axis to an operative position against said wall, and positioning means on said second arm member engageable against said wall in the course of movement of said first arm member toward said operative position and thereafter causing turning of said second arm member against the urging of said first spring means.

13. A cassette tape recording and/or reproducing apparatus according to claim 12; further comprising a rotated capstan for engaging the tape in the cassette located on the chassis, a pinch roller, a support arm pivoted on said first arm member and rotatably carrying said pinch roller, a second opening in said wall through which said pinch roller can extend into the cassette for pressing the tape against said rotated capstan when said first arm member is moved to said operative position, and third spring means urging said support arm to pivot relative to said first arm member in the direction for pressing said pinch roller against said capstan.

14. A cassette tape recording and/or reproducing apparatus according to claim 12; in which said means mounting the first arm member on said chassis includes a slit in said wall parallel to said first axis and a bent end portion at said one end of the first arm member engaging in said slit, said second spring means is in the form of a bowed leaf spring secured intermediate its ends to said wall and having a major portion of its length interposed between said other side of said wall and said first arm member for urging the latter to swing away from said wall, and an end of said leaf spring remote from said major portion engages said bent end portion of the first arm member for retaining said bent end portion in said slit.

15. A cassette tape recording and/or reproducing apparatus according to claim 12; in which said pushbutton means includes a manually depressible body portion, an actuator portion engageable with said first arm member for said angular displacing of the latter to said operative position, and relatively stiff resilient means interposed between said body and actuator portions to flex only upon further manual depressing of said body portion after said first arm member has been displaced to said operative position.

* * * * *

UNITED STATES PATENT AND TRADEMARK OFFICE
CERTIFICATE OF CORRECTION

PATENT NO. :  4,739,423
DATED     :  April 19, 1988
INVENTOR(S) :  Mitsuru Ida

It is certified that error appears in the above-identified patent and that said Letters Patent is hereby corrected as shown below:   Title page:

Filing date should be July 31, 1984 - not July 31, 1986.

Column  4, line 35, after "in" insert --full lines on
         Fig. 4 to an operative position shown in--.

Column  6, line 26, change "coled" to --coiled--.

Column 10, line 46, change ";" to --j--.

IN CLAIMS

Column 11, line 57, change ";" to --,--.

Signed and Sealed this

Twentieth Day of December, 1988

*Attest:*

DONALD J. QUIGG

*Attesting Officer*          *Commissioner of Patents and Trademarks*